(12) United States Patent
Kmetz

(10) Patent No.: US 8,182,905 B2
(45) Date of Patent: May 22, 2012

(54) CERAMIC MATRIX LAMINATES

(75) Inventor: Michael A. Kmetz, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 994 days.

(21) Appl. No.: 11/654,302

(22) Filed: Jan. 17, 2007

(65) Prior Publication Data

US 2007/0172639 A1    Jul. 26, 2007

Related U.S. Application Data

(60) Provisional application No. 60/760,990, filed on Jan. 20, 2006.

(51) Int. Cl.
*B32B 7/02*    (2006.01)

(52) U.S. Cl. .......... 428/212; 428/311.11; 428/307.3; 428/307.7; 428/411.1

(58) Field of Classification Search .......... 428/311.11, 428/307.3, 307.7, 212, 411.1
See application file for complete search history.

(56) References Cited

U.S. PATENT DOCUMENTS

| | | | | |
|---|---|---|---|---|
| 5,087,511 A | * | 2/1992 | Locey | 428/218 |
| 5,143,790 A | * | 9/1992 | Sattinger | 428/457 |
| 5,162,143 A | * | 11/1992 | Porter et al. | 428/179 |
| 6,097,829 A | * | 8/2000 | Guenther et al. | 381/425 |
| 6,703,331 B1 | * | 3/2004 | Bruce et al. | 442/386 |
| 6,759,117 B2 | * | 7/2004 | Bauer et al. | 428/293.4 |
| 6,820,334 B2 | * | 11/2004 | Kebbede et al. | 29/889.1 |
| 6,908,660 B2 | * | 6/2005 | Bauer et al. | 428/163 |
| 2005/0093188 A1 | | 5/2005 | LaForest et al. | |

OTHER PUBLICATIONS

European Search Report, Jun. 15, 2007.

* cited by examiner

*Primary Examiner* — David Sample
*Assistant Examiner* — Lawrence Ferguson
(74) *Attorney, Agent, or Firm* — Bachman & LaPointe, P.C.

(57) ABSTRACT

The invention provides systems and methods for forming low density ceramic felt material cores which are sandwiched between ceramic matrix composites to form a ceramic matrix laminate possessing a high strength-to-density ratio while maintaining a stiffness required for mechanical applications. The core and face plates are coupled together using a chemical vapor process.

9 Claims, 6 Drawing Sheets

CERAMIC MATRIX LAMINATES

REFERENCE TO RELATED APPLICATION

This application claims the benefit of U.S. Provisional Application No. 60/760,990, filed on Jan. 20, 2006, which is incorporated herein by reference in its entirety.

BACKGROUND OF THE INVENTION

The invention relates generally to the field of ceramic matrix laminates. More specifically, embodiments of the invention relate to systems and methods for fabricating low density ceramic felt core materials which are sandwiched between two ceramic matrix composites (CMCs).

Sandwich structures are materials that consist of two thin load-bearing face plates joined to a thicker, but less-dense core material. Loads are carried by the face plates with the core acting as a load transfer medium. Depending on the application, the face plates may be fabricated from metal, plywood or fiber reinforced composites. The core may be fabricated from a hard foam or honeycomb material, or a rigid lightweight material.

Sandwich structures are commonly employed as building materials where a high strength to density is required, and are also often used in the aircraft industry. In addition to a high strength to density ratio, the sandwich structure should also possess a high load carrying capability and resistance to torsion. For a sandwich structure functioning as a structural material in a hot section of an aircraft engine, the material must also have good resistance to oxidation, together with high strength and toughness at elevated temperatures.

One problem with the fabrication of a sandwich type structure is forming a high-quality bond between the face plates and the core material. If the bond between the face plates is weak, the material will fail in shear and not support the full load from the face plates. In many structures, the face plates are joined to the core by use of adhesives. In sandwich structures employed for high-temperature applications, the use of adhesives to bond the face plates to the core material may lead to debonding of the face plates from the core due to different coefficients of thermal expansion among the materials. In addition, most high temperature glues shrink, outgas, and crack when heated to the application temperature. This ultimately results in a weak or failed bond.

Although there are various systems and methods of constructing ceramic matrix laminates, such systems and methods are not completely satisfactory. Therefore, improved systems and methods of constructing ceramic matrix laminates are desirable.

SUMMARY OF THE INVENTION

The inventor has discovered systems and methods for fabricating a ceramic matrix laminate (CML) using a ceramic felt core between two ceramic matrix composite (CMC) face plates coupled together using a chemical vapor process. Variants of the methods can be in-situ, where the core is fabricated and the density of the CMC face plates is increased at the same time, or where CMC face plates are infiltrated with a prefabricated core.

One aspect of the invention provides methods for fabricating a ceramic matrix laminate. Methods according to this aspect of the invention preferably start with forming a preform comprising providing a core substrate, providing a first and a second face plate precursor, disposing the core substrate between the first and the second face plate precursors, attaching the core substrate to the first and the second face plate precursors, and infiltrating the preform.

Another aspect of the method is applying a compression assembly about the preform before infiltrating the preform.

Yet another aspect of the invention is a ceramic matrix laminate. Ceramic matrix laminates according to this aspect of the invention comprise a first and a second face plate, the first face plate having a density and the second face plate having a density, a core material having a density, the core material being disposed between the first and the second face plates, and the core material being coupled to the first and the second face plate using a chemical vapor process.

Another aspect of the invention provides methods for fabricating a hollow core material. Methods according to this aspect of the invention preferably start with providing a core substrate, applying a compression assembly about the core substrate, infiltrating the compression assembly with the core substrate, removing the compression assembly from the core substrate after infiltrating and oxidizing the core substrate after infiltration.

Other embodiments and advantages of the methods and systems will become apparent to those skilled in the art after reading the detailed description of the preferred embodiments.

DETAILED DESCRIPTION

Figure 3:
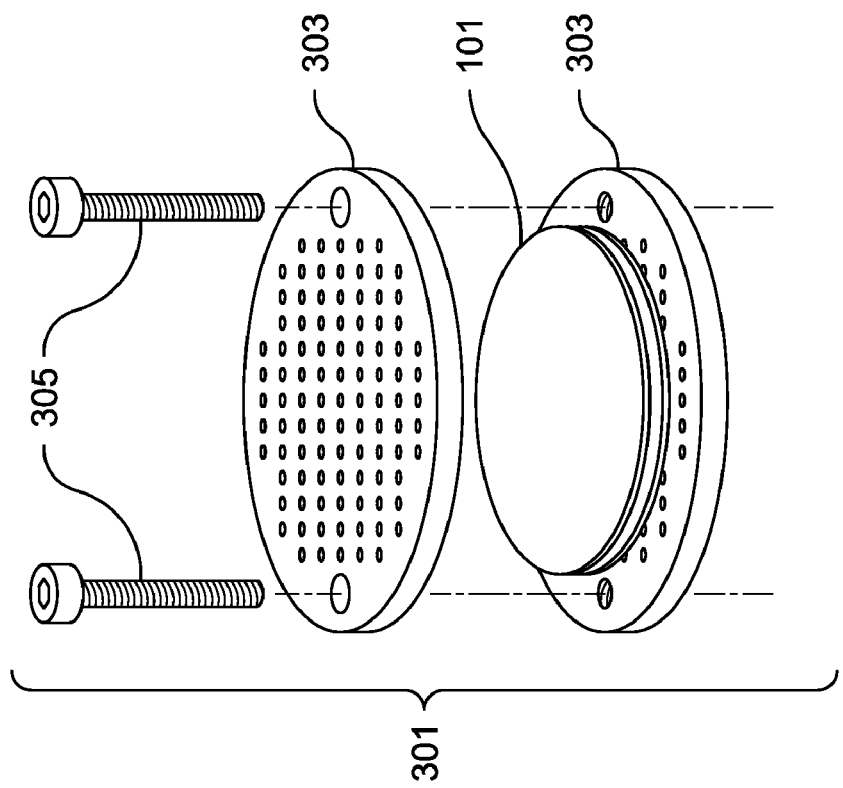
FIG. 3 is an exemplary exploded perspective view of a laminate compressing assembly.

Embodiments of the invention will be described with reference to the accompanying figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Embodiments of the invention provide systems and methods for forming low density ceramic felt material cores which are sandwiched between two CMCs to form a CML possessing a high strength-to-density ratio while maintaining a stiffness required for mechanical applications. The CML has structural advantages similar to honeycomb-core polymer composites or metal materials, but surpasses these materials by having the ability to survive high temperature environments.

Fiber reinforced CMC imbues the CML with high-strength and toughness, and the ceramic fiber felt core provides low density. The resulting CMLs have varied applications such as heat exchangers, heat shields, engine parts, acoustic liners, furnace insulation, firewalls, etc. Table 1 shows some of the uses for these materials.

TABLE 1

| Product Area | Examples | Likely Industrial Market |
|---|---|---|
| advanced heat engines | combustors, liners, wear parts | high temperature gas turbines and diesel engines |
| heat recovery equipment | air preheaters, recuperators | energy-intensive industry processes (e.g. aluminum remelters, steel reheaters, etc.) |
| burners and combustors | radiant tube burners | high temperature heating and/or controlled atmosphere heating, melting equipment |
| process equipment | reformers, reactors | chemical processing equip. petroleum refining |
| waste incinerator systems | handling, internals | toxic/hazardous waste facilities |
| separation/filtration systems | filters, substrates, molten metal filters | gas turbine, diesel exhausts |
| refractories | furnace linings, crucibles etc. | high temperature heating/melting/heat treating equip. |
| structural components | beams, panels, decking, containers | fire equip., missile protection, major infrastructure applications |

The invention also provides a method for fabricating a rigidized hollow fiber core. The hollow fiber core reduces the density of the resulting CML.

The rigidized hollow fiber core may be used as an alternative for aluminum and titanium honeycomb cores that are presently used in polymer matrix composites (PMC). Their light weight, high-temperature resistance and tailorable compression strength makes them good candidates for applications in PMC structures.

The invention employs a low cost, carbon fiber felt material, such as CH grade available from Fiber Materials, Inc., or Graphite WDF felt, from National Specialty Products, for use as a substrate to fabricate a core. The material has fibers oriented in a "z" direction—perpendicular to core length (x) and width (y). The "z" fibers act as pillars, increasing the compressive strength of the core.

The ability to create hollow fibers and to control core and CMC pore size is important in the fabrication of separators or filters for use in high-temperature and/or highly corrosive environments.

To control pore size and distribution in the core material as well as the CMC, the invention may employ chemical vapor infiltration (CVI) or chemical vapor deposition (CVD). The CVD and CVI process are similar and are often used interchangeably. CVD is a process where a solid is deposited from a vapor phase. CVI is a process where a pore filling solid is deposited from a vapor phase. CVI is usually performed at lower flow rates for longer periods of time and often at lower pressures. CVI allows the microstructure and macrostructure of the CML to be tailored to a specific need by varying infiltration time and pressure. The use of CVI offers the ability to fabricate ceramic materials comprised of carbon, borides, carbides, nitrides, oxides, silicides, sulfides, beryllides, selenides, tellurides, intermetallic compounds or alloys. CVI is a non-line-of-sight coating process which is ideal for coating the core material. CVI also offers the ability to simultaneously fabricate the core and couple the core with the CMC, thereby forming a CML.

Using CVI to fabricate a core, followed by coating and coupling CMC face plates to the prefabricated core allows for modifications to be made in the core structure before coupling the CMC face plates thereto. For example, air passages may be incorporated in the core by fabricating a core first, and then laser drilling holes therein to provide cooling passages. Face plates could then be coupled to the core for CML applications such as turbine blades. The face plates of the CML may also be similarly perforated for cooling and acoustic absorption applications.

In embodiments, the core may be fabricated from the same material as the CMC matrix. Matching the material compositions minimizes thermal expansion differences between adjacent materials (i.e., between the core 103 and the CMC face plates 105).

Figure 1:
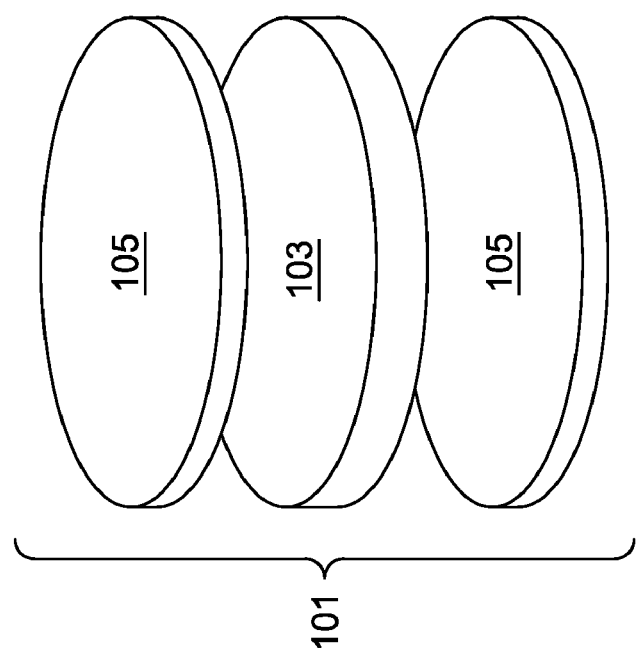
FIG. 1 is an exemplary exploded perspective view of a core preform.

Shown in FIG. 1 is a CML preform 101 according to the invention. The preform 101 comprises a carbon fiber felt core 103 and two CMC face plates 105.

The precursor for the CMC face plates 105 may be a fibrous material such as Nicalon. The face plate material may have more than one ply. Typically, the ceramic cloth may be first coated with boron nitride (BN) in a CVI process to provide an interface in between the matrix and the fibers. This interface is often required for proper CMC mechanical properties. The two face plates may be assembled in any suitable manner, such as in a 0°/90° lay-up.

Figure 2:
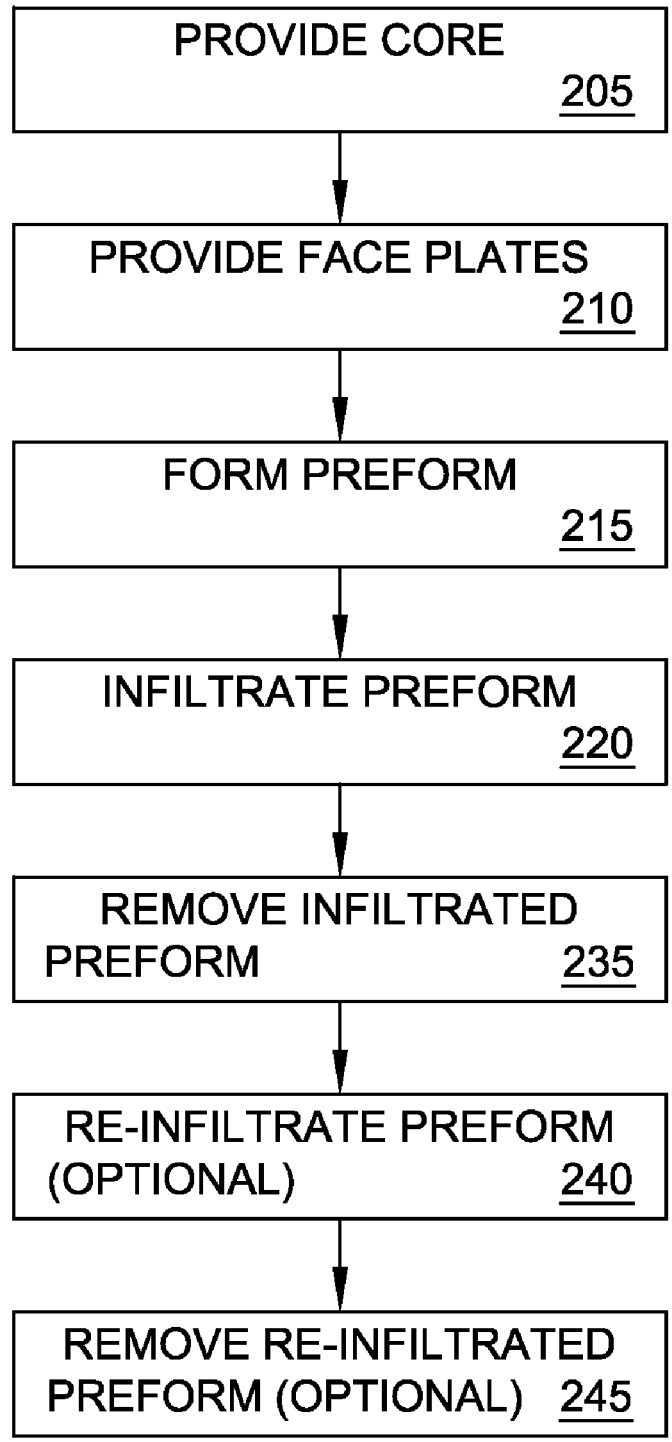
FIG. 2 is a block diagram of an exemplary lamination method according to the invention.

An in situ method for fabricating a CML is shown in FIG. 2. A core 103 is provided (step 205) in a size or shape suitable for a particular part, size, application, or other purpose. Top and bottom face plates 105 are similarly provided for a top and a bottom surface of the CML (step 210). The CMC face plates 105 are attached to the top and bottom surfaces of the core substrate 103 by sewing (preferably using Nicalon yarn), stapling, gluing, compressing, or other attaching methods to form a preform (step 215). The preform 101 is then placed in a reactor and infiltrated (step 220).

Infiltration (step 220) may comprise infiltrating the core material with SiC to bond the core with the CMC using either a force-flow isothermal CVI process or an isobaric-isothermal CVI process. Both CVI processes employ hydrogen and methyltrichlorosilane (MTS) to produce SiC, and both CVI processes achieve the same infiltration result, but they have different infiltration times and different set-up complexities. In a force-flow isothermal CVI process, the precursors are forced through the preform by use of a pressure gradient. A seal or gasket is needed to prevent the reagents from passing around the object to be coated, thereby making it difficult to infiltrate complex shapes. In the isobaric-isothermal CVI process (conventional CVD), the precursors are allowed to flow around the preform. The gasses must diffuse into the preform to deposit the coating requiring a longer period of time. This isobaric-isothermal CVI process is easier to set-up and is the method preferred by industry. The force-flow isothermal process is faster than the isobaric-isothermal process, and may be more desirable in embodiments.

During the CVI process, reactant gases are formed, for example, by bubbling ultra-high purity hydrogen gas through methyltrichlorosilane (MTS) to form SiC at a flow rate of about 200 SCFM. The gas enters the reaction chamber (reactor) at room temperature and is heated to about 1,100° C. as it approaches the deposition surface. Infiltration is typically performed for approximately 24 to 48 hours.

During the infiltration period, SiC atoms are distributed throughout the reactor and permeate the core material. The SiC atoms coat the individual graphite fibers within the core substrate growing outwards and where the fibers touch each other, form a unitary SiC structure. The SiC coating thickness, and therefore density, depends upon the infiltration time and pressure. A longer infiltration period increases coating thickness, increasing density. With increased density, pore size is reduced along with distribution due to the SiC coating restricting the inner voids or passages.

After infiltration, the CML is removed from the reactor (step 235). The best coupling between the face plates 105 and core 103 is located closest to where the layers are fastened together prior to infiltration. In embodiments, the resulting CML may be used, or it may be returned to the reactor for a post-processing infiltration for further densification (optional steps 240 and 245). The result is a CML.

For greater adhesion, compressing the preform 101 together during infiltration produces a CML exhibiting uniform coupling over all mating surfaces. Shown in FIG. 3 is a compression assembly 301. The compression assembly 301 comprises two perforated graphite plates 303 and at least two graphite fasteners (bolts, clamps, clips, and others) 305 for coupling the graphite plates together. The assembly 301 applies a uniform pressure over the top and bottom surfaces of the preform 101.

Figure 4:
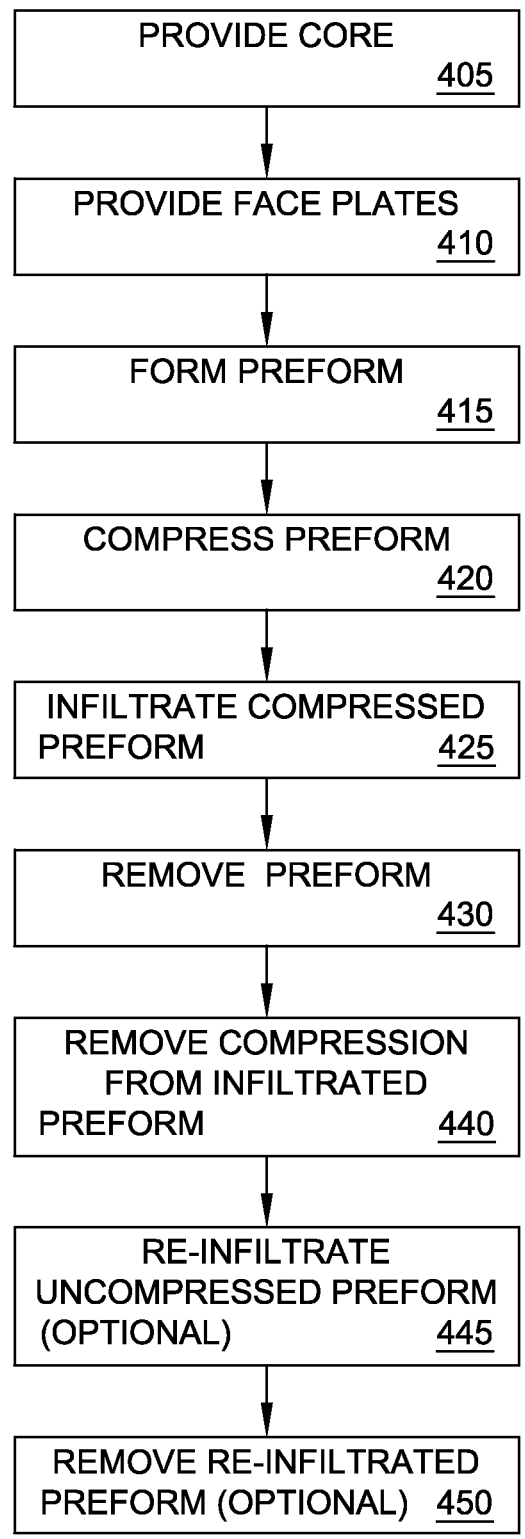
FIG. 4 is a block diagram of an exemplary compression lamination method according to the invention.

A method of using the compression assembly 301 is shown in FIG. 4. The preform 101 (steps 405, 410, 415) is placed between the two perforated graphite plates 303. Grafoil may be placed between the graphite plates and the preform to minimize SiC growth between the preform and graphite plates. The preform 101 is uniformly compressed using the compression assembly 301 (step 420).

The compression assembly 301 (with preform 101) is placed in a reactor and infiltrated with SiC (step 425). SiC may be infiltrated into the CMC and core using a force-flow isothermal CVI process or an isobaric-isothermal CVI process depending on available infiltration time.

After partial infiltration, the preform 101 with compression assembly 301 is removed from the reactor (step 430) and the compression assembly 301 is removed (step 440). The resulting CML may be used, or returned to the reactor for a post-processing infiltration for further densification (optional steps 445 and 450). The result is a CML.

Figure 5:
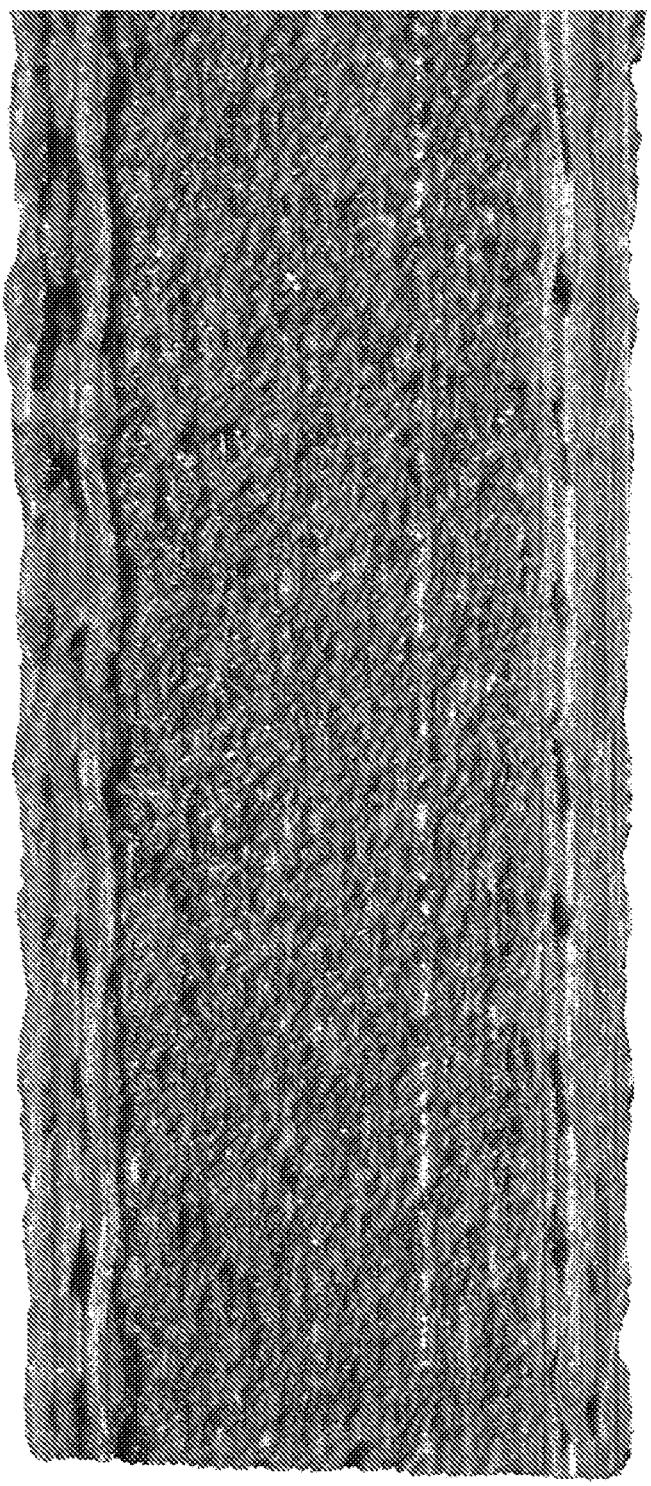
FIG. 5 is a photomicrograph of a CML produced according to the invention wherein the top and bottom face plates are ceramic matrix composites and the middle area is the core. (magnification ~50×)

FIG. 5 shows a photomicrograph of a CML fabricated according to the invention. The CMC appears as two lighter areas 501, 503 (having a 0°/90° lay-up) over the darker C/SiC core 505. For this CML, the bulk density was approximately 1.8 g/cm$^3$ (0.065 lb/in$^3$). The density of the Nicalon mats used in the CMCs was approximately 2.55 g/cm$^3$.

Figure 6:
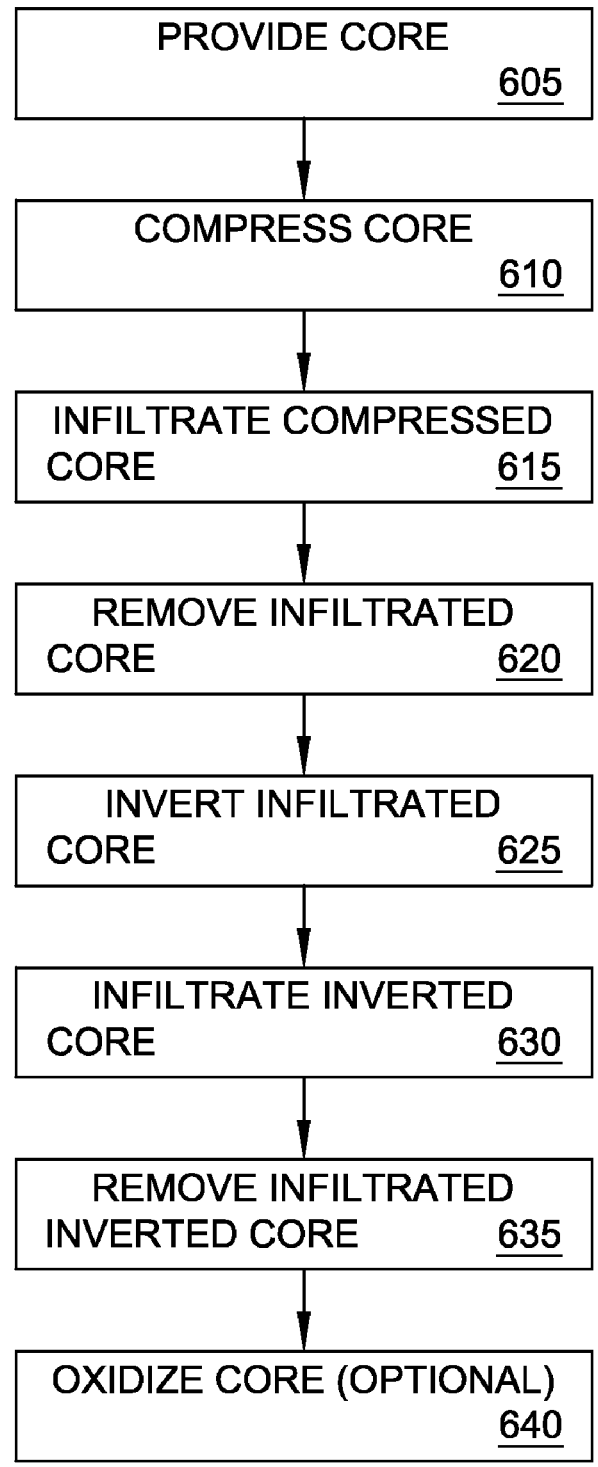
FIG. 6 is a block diagram of an exemplary core prefabrication method according to the invention.

For the method shown in FIG. 6, core materials are prefabricated by coating the core fibers with SiC before the core is assembled into a CML preform. As an example, a 3" by 0.25" circular piece of core substrate having a density of 0.080 g/cm$^3$ was placed between two 0.251" thick perforated graphite plates 303 (step 605). The graphite plates 303 were coupled together thereby compressing the core material before infiltration began (step 610). The core material (with graphite plates) was then coated with SiC (step 615) using CVD. SiC was coated onto the core substrate fibers by passing hydrogen through MTS at a rate of approximately 1,000 cm$^3$/min for approximately 1.5 hours at approximately 1,013° C.

The core material with graphite plates 303 was then removed from the reactor (step 620) and inverted (step 625). Infiltration was then resumed for approximately 45 minutes (step 630). Then, the infiltrated inverted core was removed (step 635). The bulk density of this SiC coated graphite core was approximately 0.266 g/cm$^3$ (16.605 lb/ft$^3$). Using this method for fabricating cores, cores may have bulk densities ranging from about 14 lb/ft$^3$ to about 150 lb/ft$^3$. Thereafter, the infiltrated core may be joined between two CMCs in any suitable manner to create a CML. The CMC face plates may be coupled to the fabricated core using CVD, or by using a preceramic inorganic polymer. If the face plates are coupled to the core using CVD, the core will receive another infiltration of SiC during the process thereby increasing the density of the core. If the core is adhered to the CMC face plates using a preceramic inorganic polymer, the bond between the core and CMC face plates may be weaker, which may cause the CML to fail in shear. Some exemplary preceramic inorganic polymers that may be used for coupling a core to CMC face plates include Starfire Systems, Incorporated SiC ceramic precursor resin, or KiON Corporation CERACET polysilazane silicon nitride ($Si_3N_4$) ceramic precursor resin.

In alternate embodiments, before the infiltrated core is joined between two CMCs to form a CML, it may be desirable to oxidize the carbon fiber out of the core to yield hollow SiC fibers in the core (step 640). The carbon may be oxidized out of the SiC coated core by placing the core (with or without graphite plates) in an air furnace set at approximately 1,149° C. (2,100° F.) for approximately 20 hours. Carbon will burn in air fairly rapidly at 800° C. Furnace temperatures much greater than that may not be necessary. When the SiC coated core-stops losing weight, the oxidation removal process is complete.

Figure 7:
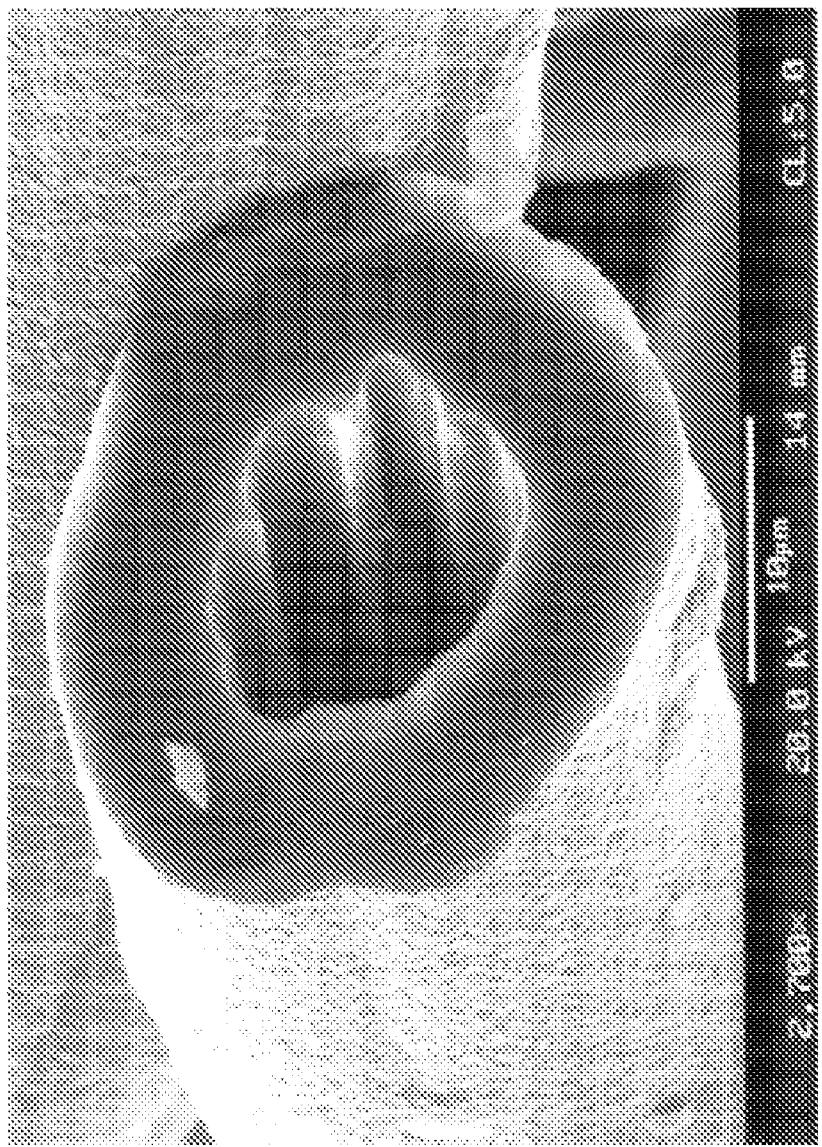
FIG. 7 is a photomicrograph of a fractured end of an SiC coated carbon fiber after oxidation according to the invention.

Shown in FIG. 7 is a scanning electron microscopy (SEM) image of a fractured, oxidized fiber. Analysis of the heat-treated core shows that the carbon substrate has been fully oxidized leaving hollow SiC fibers. The remaining foam consists of hollow SiC fibers having an average inner diameter of about 10 μm and a wall thickness of about 2 μm. The loss of the internal core of each fiber further decreases the density of the core, which in turn lowers the overall density of the fabricated CML.

A 2.56"×0.25"×0.28" specimen was cut from a 3" circular CML fabricated by the method of FIG. 4. This specimen was subjected to a three-point short beam shear test. The bulk density of the CML was approximately 1.8 g/cm$^3$ (0.065 lb/in$^3$). The results of the bend test show that the laminate failed in the top face plate while undergoing tension. The strength of the face plate was found to be approximately 18.3 Ksi. This type of failure mode is desired for laminate structures.

The core material fabricated by the method of FIG. 6 achieved a shear stress of approximately 800 psi without failure, while existing materials showed a failure in shear stress at approximately 100 psi. These results indicate that the materials of this invention have an eight time increase in shear stress over existing materials.

Table 2 shows the results of compression testing oxidized and non-oxidized SiC core materials.

TABLE 2

| Total time of infiltration (hours) | ρ (g/cm³) | Oxidized | Brittle crushing strength (MPa) |
|---|---|---|---|
| 12 | 0.331 | Yes | 1.95 |
|  | 0.408 | No | 3.55 |
| 24 | 0.686 | Yes | 8.73 |
|  | 0.709 | No | 9.80 |
| 36 | 0.925 | Yes | 12.7 |

The table shows that there is a linear relationship between density and crushing strength. The measured brittle crushing strength to density ratio was slightly higher for the non-oxidized cores than for the oxidized cores.

The method of FIG. 4 may be varied by providing (at step 405) a prefabricated SiC coated hollow core as described in FIG. 6 (after step 640), if desired. In this manner, the core density and porosity may be tailored for a specific application requirement during fabrication of the core, prior to fabrication of the CML.

Table 3 shows a comparison between different lightweight core sandwich structures and the structure of the invention.

TABLE 3

| Types of laminates | Temperature | Disadvantages |
|---|---|---|
| polymer/honeycomb | to 600° F. | temperature limited |
| carbon/carbon/foam core | to 2,000° F. | requires oxidation protection |
| SiC foam/bonded core | to 2,000° F. | shear strength limited |
| SiC felt/welded-core (This invention) | to 2,000° F. | none of the above |

Cores having bulk densities ranging from about 0.268 to 1.007 g/cm³ were fabricated by various methods of this invention and they were found to have robust mechanical properties. The cores that were tested were all fabricated by a conventional CVI process (isothermal-isobaric). A laminate structure was fabricated according to the method of FIG. 6 and was found to have a high section modulus in bending and very high stiffness to weight ratios.

Although the invention herein has been described with reference to particular embodiments, it is to be understood that these embodiments are merely illustrative of the principles and applications of the present invention. It is therefore to be understood that numerous modifications may be made to the illustrative embodiments such as using one face plate for the laminate and that other arrangements may be devised without departing from the spirit and scope of the present invention as defined by the appended claims.

What is claimed is:

1. A ceramic matrix laminate comprising:
a first and a second face plate, the first face plate having a density and the second face plate having a density;
a core material having a density, the core material being disposed between the first and second face plates; and
the core material being coupled to the first and second face plates using a chemical vapor process,
wherein the core material density is less than the first face plate density and the second face plate density, and wherein the core material density is about 0.2 g/cm³ to about 2.0 g/cm³, the first face plate density is about 1.9 g/cm³ to about 2.5 g/cm³, and the second face plate density is about 1.9 g/cm³ to about 2.5 g/cm³, and
wherein each said face plate comprises a ceramic cloth material having a plurality of fibers, and said ceramic cloth being coated with boron nitride.

2. A ceramic matrix laminate comprising:
a first and a second face plate, the first face plate having a density and the second face plate having a density;
a prefabricated core material having a density, the core material being disposed between the first and second face plates; and
the core material being coupled to the first and second face plates using a chemical vapor process,
wherein the prefabricated core material density is in a range of about 0.2 g/cm³ to about 1.0 g/cm³, and the prefabricated core material density is less than the first face plate density and the second face plate density; and
wherein said core material consists of hollow SiC fibers.

3. A ceramic matrix laminate comprising:
two load-bearing face plates; and
a core material sandwiched between the two load-bearing face plates, wherein the core material is less dense than the two load-bearing face plates and comprises a felt material having fibers oriented in a direction perpendicular to a core length direction and a core width direction, wherein the core material density is less than the first face plate density and the second face plate density, and wherein the core material density is about 0.2 g/cm³ to about 2.0 g/cm³, the first face plate density is about 1.9 g/cm³ to about 2.5 g/cm³, and the second face plate density is about 1.9 g/cm³ to about 2.5 g/cm³ and wherein the core material is bonded to the load-bearing face plates via at least one of the following processes:
a chemical vapor infiltration process; and
a chemical vapor deposition process.

4. The ceramic matrix laminate of claim 3, wherein the core material comprises at least one of: a carbon felt, and a SiC felt.

5. The ceramic matrix laminate of claim 3, wherein each load-bearing face plate comprises at least one of: a SiC ceramic matrix composite, a Nicalon fiber mat, and a SiC fiber mat.

6. The ceramic matrix laminate of claim 3, wherein the core material and the load-bearing face plates are joined together prior to being bonded via the chemical vapor infiltration process.

7. The ceramic matrix laminate of claim 6, wherein the core material and the load-bearing face plates are joined together via at least one of: sewing, stapling, gluing, and compressing.

8. The ceramic matrix laminate of claim 3, wherein the core material comprises hollow fibers.

9. The ceramic matrix laminate of claim 3, wherein the core material has a shear stress of at least about 800 psi.

* * * * *